United States Patent

[11] 3,524,403

| [72] | Inventors | Lester D. Treloar<br>Rte. 2, Fort Dodge, Iowa 50501;<br>Francis L. Johnson, 1516 6th Ave N., Fort Dodge, Iowa 50501 |
|---|---|---|
| [21] | Appl. No. | 777,382 |
| [22] | Filed | Nov. 20, 1968 |
| [45] | Patented | Aug. 18, 1970 |

[54] BARBECUE OVEN
9 Claims, 8 Drawing Figs.

[52] U.S. Cl. .............................................. 99/331,
99/262; 99/339, 99/341; 99/343, 99/393; 99/400,
99/427; 99/443, 99/446, 126/41; 126/59.5
[51] Int. Cl. .............................................. A47j27/62,
A23b 1/64
[50] Field of Search ............................................ 126/41,
59.5; 99/331, 339, 343, 341, 393, 450, 426, 427
443, 440, 448, 420, 421, 259, 260, 261, 262

[56] References Cited
UNITED STATES PATENTS

| 2,558,569 | 6/1951 | Koch ............................ | 99/331X |
| 2,591,072 | 4/1952 | Hughes ......................... | 99/331X |
| 2,667,157 | 1/1954 | Vastola ......................... | 126/59.5 |

*Primary Examiner*— Billy J. Wilhite
*Attorney*—Zarley, McKee and Thomte

ABSTRACT: A barbecue oven comprising a housing having a food support means provided therein which is positioned over a combustion chamber of the gas fired, wood burning type. A water sprinkling system is provided in the combustion chamber adapted to spray water on the burning wood at a predetermined time. First and second temperature responsive switches are mounted in the housing adjacent the food support means and are electrically connected to the water sprinkling system and the valve controlling the gas burner means respectively. When the temperature in the oven reaches a predetermined level, the switches are activated to cause the gas firing means to be extinguished and the water sprinkling system to spray water on the burning wood to prevent the food from becoming burned. The oven also includes means to turn the food to evenly cook the same. A blower means is in communication with the oven flue and is adapted to draw air into the flue from outside of the housing thereby reducing the draft in the flue to reduce the combustion rate of the burning wood.

Patented Aug. 18, 1970
3,524,403
Sheet 1 of 2
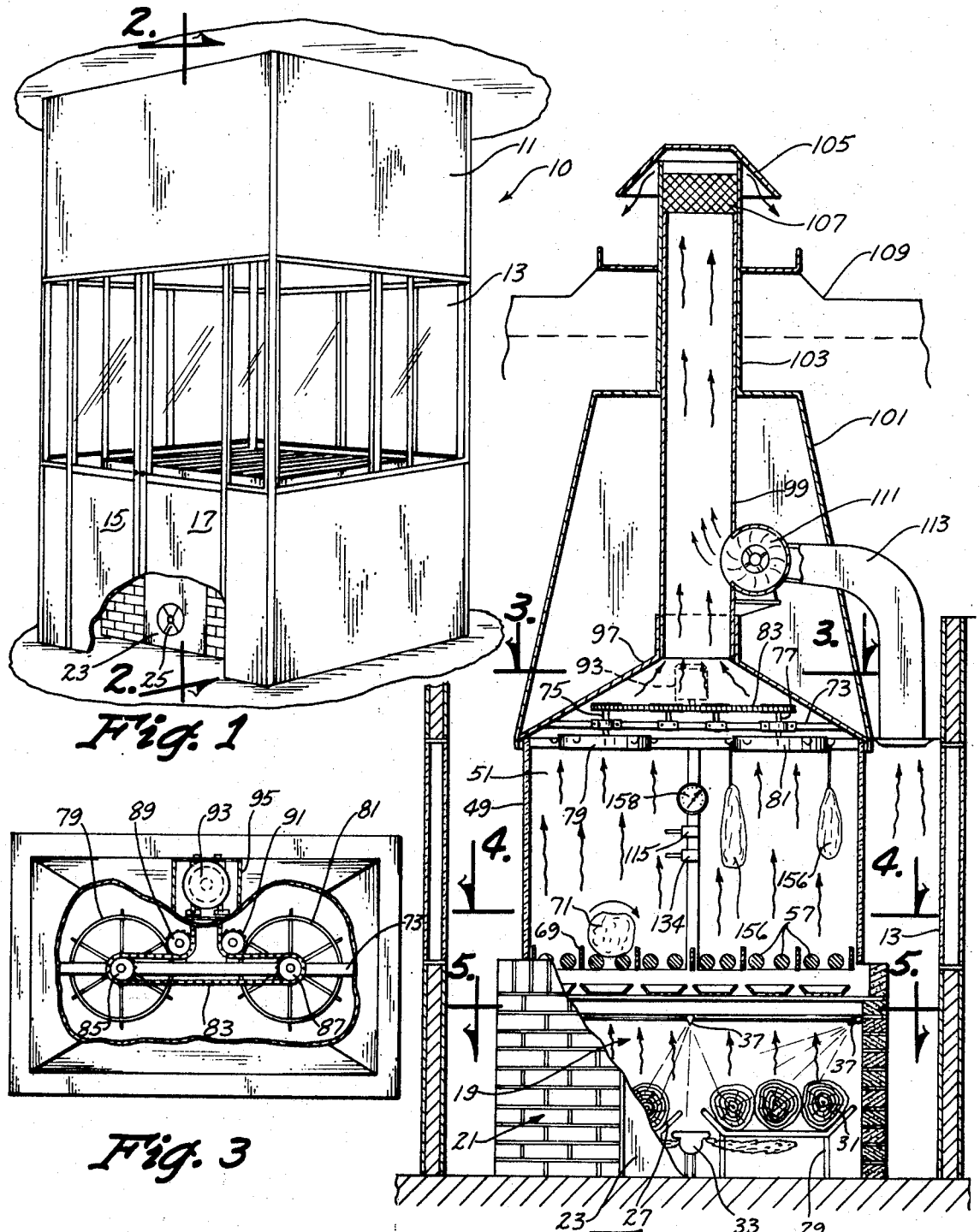
INVENTORS
LESTER D. TRELOAR
FRANCIS L. JOHNSON
BY
Zarley, McKee & Thomte
ATTORNEYS Patented Aug. 18, 1970 3,524,403

INVENTORS
LESTER D. TRELOAR
FRANCIS L. JOHNSON
BY
Zarley, McKee & Thomte
ATTORNEYS

BARBECUE OVEN

Conventional barbecue ovens do not include adequate means to effectively control the heat in the oven or to control the combustion of the wood, briquettes, etc. As a result, the conventional barbecue ovens do not efficiently cook the food in an entirely satisfactory manner and must be constantly attended.

Therefore, it is a principal object of this invention to provide a barbecue oven having means associated therewith to permit the temperature therein to be precisely controlled.

A further object of this invention is to provide a barbecue oven having a gas burner means and a water sprinkling means which are controlled by heat responsive sensing elements in the oven.

A further object of this invention is to provide a barbecue oven which insures that the food placed therein will be evenly cooked.

A further object of this invention is to provide a barbecue oven which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the oven with portions thereof cut away to more fully illustrate the invention;

FIG. 2 is an enlarged sectional view as seen along lines 2-2 of FIG. 1 with portions thereof cut away to more fully illustrate the invention;

FIG. 3 is a sectional view as seen along lines 3-3 of FIG. 2;

Figures 4, 5:
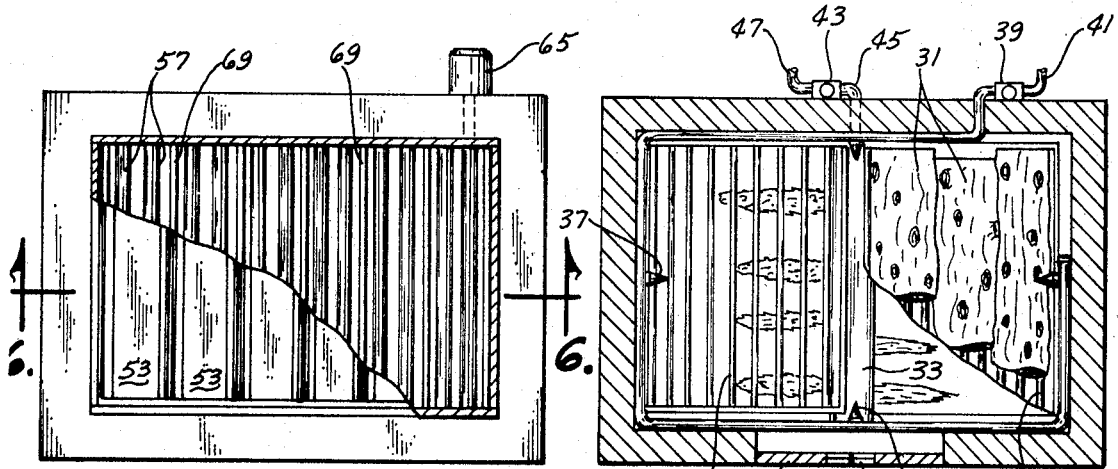
FIG. 4 is a sectional view as seen along lines 4-4 of FIG. 2.
FIG. 5 is a sectional view as seen along lines 5-5 of FIG. 2.

The oven of this invention is generally designated by the reference numeral 10 which is enclosed by an outer housing 11 having a plurality of windows 13 provided therein to permit the observation of the food being cooked in the oven. Housing 11 has a pair of doors 15 and 17 mounted therein to provide access to the interior of the housing.

The numeral 19 generally designates a combustion chamber which is surrounded by a brick wall means 21 having an access door 23 mounted therein. A draft 25 is provided in the door 23 to regulate the amount of air entering the combustion chamber. A pair of spaced apart supports 27 and 29 are provided in the combustion chamber 19 and are adapted to support logs 31 thereon which are usually of the hickory type. A gas burner 33 is mounted in the combustion chamber 19 between the supports 27 and 29 and is adapted to supply a flame to the logs 31 to ignite the same and to provide heat in the combustion chamber to aid in the cooking of the food. A water conduit 35 is mounted in the combustion chamber 19 and surrounds the supports 27 and 29 and has a plurality of spray nozzles 37 provided thereon adapted to spray water on the logs 31 at a predetermined time. Conduit 35 is in communication with a water valve 39 connected to a source of suitable water supply by a conduit 41. The gas burner 33 is connected to a gas valve 43 by a conduit 45 and valve 43 is connected to a suitable source of gas under pressure by a conduit 47.

Figure 6:
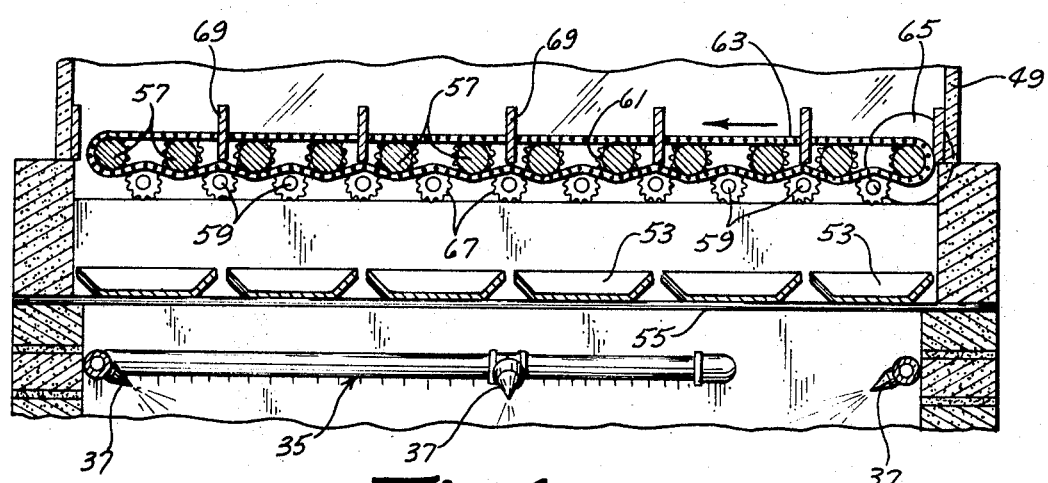
FIG. 6 is an enlarged sectional view as seen along lines 6-6 of FIG. 4.

A glass enclosure 49 extends upwardly from the upper end of the brick wall means 21 and defines a cooking chamber 51 adapted to accommodate the food to be cooked. A plurality of drip trays 53 are positioned on a support means 55 extending across the upper end of the combustion chamber 19 and are adapted to catch the drippings from the food during the cooking thereof. A plurality of shafts 57 are rotatably mounted and supported at the upper end of the combustion chamber 19 by any convenient means and a plurality of shafts 59 are rotatably mounted below the shafts 59 and are spaced with respect to the shafts 59 as best seen in FIG. 6. The shafts 57 are provided with sprockets 61 or other suitable means thereon adapted to operatively engage the chain means 63 extending therearound as illustrated in FIG. 6. Chain 63 is driven by motor 65 and the sprockets 67 on the shafts 59 serve to maintain the chain 63 in engagement with the sprockets 61 on the shafts 57. Chain 63 is mounted on one end of the shafts 57 and will cause the shaft 57 to be rotated upon the activation of the motor 65. A plurality of spaced apart plates 69 extend across the lower end of the enclosure 49 and are positioned between the shafts 59 as best illustrated in FIG. 6. The food to be cooked on the shafts 57 is generally designated by the reference numeral 71 and the food 71 is rotated in a clockwise manner (FIG. 2) upon the activation of the motor 65. The plate 69 prevents the food 71 from moving laterally with respect to the enclosure 49 and causes the meat 71 to be rotated between a pair of the plates 69.

A brace 73 extends across the upper end of the enclosure 49 and has a pair of spaced apart shafts 75 and 77 rotatably secured thereto which are rotatable about a vertical axis. The lower ends of shafts 75 and 77 have food supporting wheels 79 and 81 secured thereto respectively for rotation therewith. A chain 83 extends around the sprockets 85 and 87 mounted on the upper ends of the shafts 75 and 77 and extends around the idler sprockets 89 and 91 as best illustrated in FIG. 3. Chain 83 is driven by a motor 93 which is mounted in a housing 95 surrounding the same. The numeral 97 generally designates a conical shaped hood extending upwardly from the upper end of the enclosure 49 which is in communication with a flue 99 extending upwardly therefrom. The numeral 101 designates a hood extending upwardly from the upper end of the enclosure 49 and which encloses the hood 97 and the lower portion of the flue 99 as illustrated in FIG. 2. As seen in FIG. 2, hood 101 has a portion 103 embracing the upper end of the flue 99 to provide the necessary insulation qualities to the device. The upper end of the flue 99 is provided with a protective cover 105. As seen in FIG. 2, a filter 107 is provided in the upper end of the flue 99. The numeral 109 generally designates the building structure through which the flue 99 extends.

Figures 7, 8:
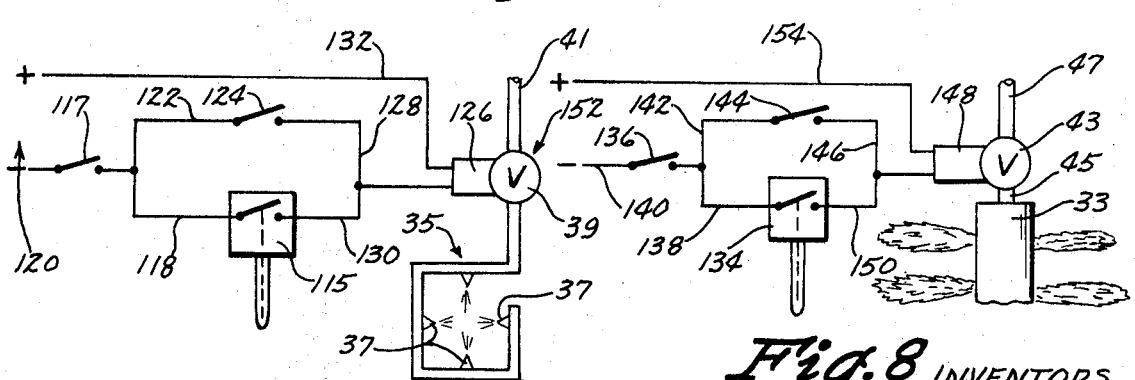
FIG. 7 is a schematic drawing of the electrical circuitry associated with a water sprinkler means.
FIG. 8 is a schematic drawing of the electrical circuitry associated with the gas firing means.

A blower means 111 is mounted in the hood 101 and is in communication with the interior of the flue 99 as illustrated in FIG. 2. Blower means 111 has a conduit 113 extending therefrom which is in communication with a source of air outside of the enclosure 49. The numeral 115 generally designates a temperature responsive switch mounted in the enclosure 49 which is adapted to open the valve 39 connected to the water conduit 35 upon being subjected to a predetermined temperature which is preferably 270 degrees in this case. One terminal of the switch 115 is connected to a switch 117 by a wire 118. Switch 117 is connected to one side of a source of electrical energy generally designated by the reference numeral 120. A wire 122 connects the switch 117 with a switch 124. Switch 124 is connected to the solenoid 126 controlling the valve 39 by a wire 128. The other side of the switch 115 is connected to the wire 128 by a wire 130. Solenoid 126 is connected to the other side of the source of electrical energy 120 by a wire 132. The numeral 134 generally designates a temperature responsive switch which is operatively connected to the gas valve 43 to control the operation thereof. One terminal of the switch 134 is connected to one side of a switch 136 by a wire 138. Switch 136 is connected to one side of a source of suitable electrical energy by a wire 140. A wire 142 connects switch 136 with a switch 144. A wire 146 connects the switch 144 with the solenoid 148 which controls the operation of the gas valve 43. The other side of the switch 134 is connected to the wire 146 by a wire 150. Solenoid 148 is connected to the other side of the source of electrical energy 152 by a wire 154. The switch 124 and the electrical circuitry controlling the water sprinkling means of FIG. 7 is of the toggle type and is merely provided to permit the operator to close the same to see if the water sprinkling system is functioning properly. Likewise, the switch 144 in the circuitry controlling the gas valve in FIG. 8 is also of the toggle type to permit the operator to close the same to see if the gas control system is functioning properly. The switch 115 is preferably temperature responsive at approximately 270 degrees Fahrenheit and when the switch is exposed to such heat, the switch becomes closed to cause the valve 39 to open thereby causing the nozzles 37 to spray a fog or mist of water on the burning logs to control the temperature of the oven. The switch 134 is preferably responsive to a temperature of 170 to 175 degrees and upon being exposed to such temperature will close to cause the gas valve 43 to shut off through the operation of the solenoid 148.

In normal operation, ribs or the like 156 will be suspended from the food supporting wheel and the motor 93 will be energized to cause the food supporting wheel to rotate thereby rotating the ribs 156 over the heat. The ribs 156 will be self-basting and any drippings therefrom will pass downwardly into the trays 53 which would normally contain beans or the like thereby giving the beans a proper flavor. The motor 65 would also be energized to cause the shafts 57 to rotate to cause the meat 71 to be rotated thereon as previously described. Drippings from the meat 71 will pass downwardly into the tray 53 to enhance the flavor of the beans therein. Heat is produced in the oven by causing the gas valve 43 to fire the logs 31 thereby providing the proper heat and smoke to be produced in the combustion chamber 19. The switches or sensing elements 115 and 134 will sense the temperature in the cooking chamber 51 and will operate the gas valve and water valve to control the temperature therein without a person being in constant attendance. The numeral 158 generally designates a thermometer provided in the cooking chamber 51 and serves to indicate the temperature in the oven. When it is desired to increase the temperature in the oven, the damper gate or draft 25 is opened and the blower means 111 is turned off which causes an increase in draft up the flue 99. When it is desired to cool the oven, the draft or damper 25 is closed and the blower means 111 is operated. The operation of the blower means 111 acts as a dilution since it draws air from outside of the oven and supplies the same to the flue 99 thereby effectively decreasing the draft in the same. Thus it can be seen that a unique barbecue oven has been provided which permits the temperature in the oven to be precisely controlled through the operation of a gas burner means and water sprinkling means which are controlled by heat responsive sensing elements in the oven. The oven may be left during the cooking of the food without fear that the food will be burned due to the automatic operation of the gas burner and the water sprinkling means. The food is rotated over the fire to insure that the meat will be evenly cooked. Thus it can be seen that the barbecue oven accomplishes at least all of its stated objectives.

Some changes may be made in the construction and arrangement of our barbecue oven without departing from the real spirit and purpose of our invention, and it is our intention to cover by our claims, any modified forms of structure or use of mechanical equivalents which may be reasonably included within their scope.

We claim:

1. In a barbecue oven:
   a combustion chamber having a gas burner means mounted therein adapted to produce heat in said combustion chamber and to ignite an ignitable material in said combustion chamber which produces the primary source of heat for cooking food,
   a food supporting means positioned above said combustion chamber, said food supporting means being mounted in an enclosure,
   a water sprinkling means in said combustion chamber adapted to spray water on said ignitable material at a predetermined time,
   first control means connected to said water sprinkling means adapted to activate said sprinkling means,
   a first temperature responsive sensing means in said enclosure above said combustion chamber connected to said first control means adapted to activate said first control means and said water sprinkling means when the temperature in said enclosure reaches a predetermined level,
   second conrol means connected to said gas burner means adapted to deactivate said gas burner means,
   and a second temperature responsive sensing means in said enclosure above said combustion chamber connected to said second control means adapted to cause said second control means to deactivate said gas burner means when the temperature in said enclosure reaches a predetermined level.

2. The oven of Claim 1 wherein said first and second control means are solenoid operated valves connected to said water sprinkling means and said gas burner means respectively.

3. The oven of Claim 1 wherein said food supporting means includes a power driven rotatable meat rack.

4. The oven of Claim 3 wherein a plurality of drip pans are positioned below said meat rack and above said combustion chamber.

5. The oven of Claim 1 wherein a flue means extends upwardly from the upper end of said enclosure, said combustion chamber having a damper gate in communication therewith, a blower means in communication with said flue means and adapted to draw air into said flue from outside of said flue and enclosure.

6. The oven of Claim 1 wherein said combustion chamber and said enclosure are enclosed by a housing extending therearound.

7. The oven of Claim 1 wherein said water sprinkling means includes a water conduit extending around said ignitable material, said conduit having a plurality of spaced apart spray nozzles mounted therein which are adapted to spray water on said ignitable material.

8. The oven of Claim 1 wherein said first temperature responsive sensing means is activated at approximately 270 degrees Fahrenheit.

9. The oven of Claim 1 wherein said second temperature responsive sensing means is activated at approximately 170-175 degrees Fahrenheit.